US008842631B2

(12) United States Patent  
Horn et al.

(10) Patent No.: US 8,842,631 B2  
(45) Date of Patent: Sep. 23, 2014

(54) DATA STATE TRANSITION DURING HANDOFF

(75) Inventors: Gavin Bernard Horn, La Jolla, CA (US); Fatih Ulupinar, San Diego, CA (US); Nileshkumar J. Parekh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 11/564,827

(22) Filed: Nov. 29, 2006

(65) Prior Publication Data

US 2007/0177547 A1 Aug. 2, 2007

Related U.S. Application Data

(60) Provisional application No. 60/741,170, filed on Nov. 30, 2005.

(51) Int. Cl.  
*H04W 36/00* (2009.01)  
*H04W 36/02* (2009.01)

(52) U.S. Cl.  
CPC .................................... *H04W 36/02* (2013.01)  
USPC ......................................... 370/331; 455/436

(58) Field of Classification Search  
CPC .. H04W 36/02; H04W 36/0072; H04W 92/20  
USPC .......... 370/401, 331, 389, 332–334; 455/436, 455/442, 443, 450, 403, 432.1, 435.1, 439  
See application file for complete search history.

(56) References Cited

U.S. PATENT DOCUMENTS

| 5,896,373 | A | * | 4/1999 | Mitts et al. ..................... 370/331 |
| 6,055,427 | A | * | 4/2000 | Ojaniemi ....................... 455/436 |
| 6,463,285 | B1 | | 10/2002 | Davies et al. |
| 6,909,899 | B2 | | 6/2005 | Wang et al. |
| 7,542,448 | B2 | | 6/2009 | Qi et al. |
| 8,571,556 | B2 | | 10/2013 | Lee et al. |
| 2001/0053144 | A1 | | 12/2001 | Leroy et al. |
| 2002/0018472 | A1 | | 2/2002 | Rinne et al. |

(Continued)

FOREIGN PATENT DOCUMENTS

| CN | 1596023 A | 3/2005 |
| CN | 1596203 A | 3/2005 |

(Continued)

OTHER PUBLICATIONS

Handoff in Wireless Mobile Network Qing_AN Zeng and Dharma P. Agrawa.*

(Continued)

*Primary Examiner* — Nizar Sivji  
(74) *Attorney, Agent, or Firm* — Nerrie M. Zohn

(57) ABSTRACT

Described herein are mechanisms and methods that facilitate seamless handoff of an access terminal between access points (transceiver modules). A first transceiver module can be providing forward link data services to an access terminal when it requests a handoff to a second transceiver module. In response, the first transceiver module can provide data that is desirably transmitted to the access terminal to the second transceiver module. A network module can inform a plurality of transceiver modules that the second transceiver module is servicing the access terminal, and can further provide data to the second transceiver module for transmittal to the access terminal.

24 Claims, 15 Drawing Sheets

(56) References Cited

U.S. PATENT DOCUMENTS

| | | | |
|---|---|---|---|
| 2002/0147016 A1* | 10/2002 | Arazi et al. | 455/443 |
| 2003/0007490 A1 | 1/2003 | Yi et al. | |
| 2003/0008653 A1 | 1/2003 | Jiang | |
| 2003/0022654 A1 | 1/2003 | Kakani et al. | |
| 2003/0224786 A1* | 12/2003 | Lee et al. | 455/432.1 |
| 2004/0005893 A1 | 1/2004 | Isobe et al. | |
| 2004/0131040 A1 | 7/2004 | Gruhl et al. | |
| 2004/0190609 A1 | 9/2004 | Watanabe | |
| 2004/0246917 A1 | 12/2004 | Cheng et al. | |
| 2005/0141477 A1 | 6/2005 | Tomita et al. | |
| 2005/0201337 A1* | 9/2005 | Heo et al. | 370/335 |
| 2005/0259663 A1 | 11/2005 | Ode et al. | |
| 2006/0274694 A1 | 12/2006 | Rajkumar et al. | |
| 2007/0047547 A1 | 3/2007 | Conner et al. | |
| 2007/0248049 A1 | 10/2007 | Fajardo et al. | |
| 2007/0265875 A1 | 11/2007 | Jiang et al. | |
| 2008/0019320 A1 | 1/2008 | Phan et al. | |
| 2008/0123673 A1 | 5/2008 | Lee | |
| 2008/0310367 A1 | 12/2008 | Meylan | |
| 2010/0098024 A1* | 4/2010 | Nagatake | 370/331 |
| 2010/0238903 A1 | 9/2010 | Kitazoe | |
| 2010/0293372 A1 | 11/2010 | Fischer et al. | |

FOREIGN PATENT DOCUMENTS

| | | |
|---|---|---|
| EP | 0777396 A1 | 6/1997 |
| EP | 1059823 | 12/2000 |
| EP | 1276279 A1 | 1/2003 |
| EP | 1320274 | 6/2003 |
| EP | 1383292 A1 | 1/2004 |
| EP | 1460866 A2 | 9/2004 |
| JP | 8168071 A | 6/1996 |
| JP | 9186704 A | 7/1997 |
| JP | 2003102055 A | 4/2003 |
| JP | 2004282652 A | 10/2004 |
| JP | 2005525757 A | 8/2005 |
| JP | 2006245824 A | 9/2006 |
| JP | 2007150538 A | 6/2007 |
| RU | 2205515 C2 | 5/2003 |
| TW | 200401543 | 1/2004 |
| WO | 9804094 | 1/1998 |
| WO | 9847302 | 10/1998 |
| WO | 9917488 A1 | 4/1999 |
| WO | WO03013044 A2 | 2/2003 |
| WO | 03096712 A1 | 11/2003 |
| WO | WO2004030396 A1 | 4/2004 |
| WO | 2004077719 | 9/2004 |
| WO | 2006130354 | 12/2006 |

OTHER PUBLICATIONS

Combined Guard Channel and Mobile Assisted Handoff for Cellular Networks B.B Madan, Member IEEE, S Dharmaraja, and K.S. Trivedi.*

Base Tranceiver Station—From Wikipedia, the free encyclopedia.*

International Search Report—PCT/US06/061436—International Search Authority—European Patent Office—Nov. 27, 2007.

Qualcomm Europe: "Qualcomm proposal for E-UTRAN Architecture and Protocols; R2-052921" 3GPP Draft; R2-052921, 3rd Generation Partnership Project (3GPP), Mobile Competence Centre ; 650, Route Des Lucioles ; F-06921.

Sophia-Antipolis Cedex , France, vol. RAN WG2, no. Seoul, Korea; 20051102, Nov. 2, 2005, pp. 1-38, XP050130142 [retrieved on Nov. 2, 2005] * section 2.4.1.3 * * section 2.6.2.3.2 * * section 3.3.2.3 * * figures 4, 8 and 18*.

Taiwan Search Report—TW095144867—TIPO—Dec. 20, 2010.

Translation of Office Action in Japanese application 2008-543581 corresponding to U.S. Appl. No. 11/564,827, citing WO2004030396, WO03013044, WO9804094A1 and JP8168071 dated Feb. 8, 2011.

Written Opinion—PCT/US2006/061436, International Search Authority, European Patent Office, Nov. 27, 2007.

European Search Report—EP10152153—Search Authority—Munich—Mar. 18, 2010.

3GPP: "User Plane Data Handling at Handover", 3GPP TSG-RAN WG2 Meeting #58, R2-071719, Kobe, Japan, May 7-11, 2007.

3GPP: "User Plane Data Handling during HO", 3GPP TSG-RAN2 Meeting #58 Tdoc, R2-071704, Kobe, Japan, May 7-11, 2007.

ETSI: Universal mobile telecommunications system (UMTS); Packet data convergence protocol (PDCP) specification, ETSI TS 125 323 v3.3.0, Sep. 2000, Advances in the Production and Use of Steel With Improvedinternal Cleanliness, Jan. 1, 1999.

Lee, et al.: "Out-of-sequence packet analysis in mobile IP handoff and its enhancement," XP002225432; Retrieved from the Internet: URL:http://netmedia.kjist.ac.kr/jongwon/papers/20023gwireless-mobileip.pdf> [retrieved on Dec. 16, 2002], the whole document.

Taiwan Search Report—TW100118050—TIPO—Sep. 23, 2013.

Taiwan Search Report—TW100118050—TIPO—Apr. 24, 2014.

* cited by examiner

DATA STATE TRANSITION DURING HANDOFF

CROSS-REFERENCE TO RELATED APPLICATION

This application claims the benefit of U.S. Provisional Patent application Ser. No. 60/741,170 entitled "METHOD AND APPARATUS FOR FORWARD HANDOFF" which was filed Nov. 30, 2005. The entirety of the aforementioned application is herein incorporated by reference.

BACKGROUND

I. Field

The following description relates generally to wireless communications, and, amongst other things, to flexible communication schemes for wireless communications systems.

II. Background

Over the last several years, wireless communications technologies have evolved from analog-driven systems (which are expensive to maintain and operate) to digital (packet-switched) systems. In conventional analog systems, analog signals are relayed on a forward link and a reverse link and typically require a significant amount of bandwidth to enable signals to be transmitted and received while being associated with suitable quality. Over time, however, network technology has evolved such that many networks are packet-switched networks, thereby allowing, for instance, Internet traffic to be relayed over a wireless link. More particularly, packet-switched systems allow data packets to be converted to analog signals and transmitted by way of a physical channel between an access terminal and a base station, router, etc. Additionally, packet-switched networks enable digital data to be relayed in its natural form (e.g., text, Internet data, . . . ).

To ensure that there is not a significant amount of data loss on an over-the-air (OTA) connection, a Radio Link Protocol (RLP) or other suitable protocol can be employed. RLP is an automatic repeat request protocol used over a wireless air interface, and can be utilized to reduce packet loss to a level that is suitable for Internet applications. Pursuant to an example, frames suitable for transmission over a physical channel can include a header, and information within such header can indicate a sequence number of the frame. The frames can be transmitted in a desired sequence to an access terminal, which can then analyze the headers to order the frames and ensure that a suitable number of frames have been received (e.g., one or more frames were not lost).

In certain network architectures, separate logical (and/or physical) entities are utilized with respect to providing an air interface to an access terminal and providing a point of attachment to the Internet for the access terminal. For instance, an example network architecture can include transceiver modules that provide an air interface attachment to an access terminal, wherein the transceiver modules can be communicatively coupled to a network module, which can provide an Internet attachment point for the access terminal. In such an architecture, conventionally the network module is charged with generating data packets and framing the data packets such that they can be transmitted to the access terminal over-the-air by a transceiver module. A transceiver module receives the frame and transmits the frame to the access terminal.

SUMMARY

The following presents a simplified summary in order to provide a basic understanding of some aspects of the disclosed subject matter. This summary is not an extensive overview, and is not intended to identify key/critical elements or to delineate the scope of such subject matter. Its sole purpose is to present some concepts in a simplified form as a prelude to the more detailed description that is presented later.

Briefly described, the disclosed subject matter relates generally to transition of data and state information amongst a plurality of modules during a handoff of an access terminal. More particularly, a network can be associated with a tiered architecture, such that transceiver modules provide an over-the-air (OTA) attachment point to an access terminal and a network module can provide an attachment point to the Internet for the access terminal. As described below, the network module can provide IP-encapsulated data packets to transceiver modules, which can then fragment and frame the data packets (e.g., in accordance with the Radio Link Protocol (RLP)) for OTA transmission to the access terminal.

When an access terminal requests a handoff from a first transceiver module to a second transceiver module, the first transceiver module can provide the second transceiver module with data that was delivered to the first transceiver module from the network module but not yet transmitted to the access terminal. Additionally, the network module can begin to provide the second transceiver module with data that is to be transmitted to the access terminal (but not duplicative with respect to data provided to the second transceiver module by the first transceiver module). The second transceiver module can review indications of sequence that are associated with data provided by the first transceiver module and the network module, and thereafter can fragment, frame, and transmit data to the access terminal in a proper sequence.

In accordance with an aspect described herein, a method for handoff at a target transceiver module comprises receiving data from a source transceiver module that is desirably transmitted to an access terminal and receiving an indication of what portion of the received data should be next transmitted to the access terminal. The method can additionally comprise receiving data from a network module that is desirably transmitted to the access terminal and selectively ordering and transmitting data received from the source transceiver module and the network module to the access terminal. Additionally, a communications apparatus is described herein, wherein the apparatus comprises a memory that includes instructions for receiving first data from a transceiver module that is desirably transmitted to an access terminal, receiving second data from a network module that is desirably transmitted to the access terminal, and transmitting the first and second data to the access terminal in a proper sequence. The communications apparatus can further comprise a processor that is configured to execute the instructions within the memory.

In accordance with another aspect, a computer readable medium can have computer executable instructions stored therein for determining that an access terminal has requested a handoff from a first transceiver module to a second transceiver module, receiving data from the first transceiver module, wherein the data is desirably transmitted to an access terminal, and receiving an indication of what data should be next transmitted to the access terminal from the first transceiver module. Additionally, the instructions can include receiving data from a network module, wherein the data is desirably transmitted to the access terminal, and transmitting data received from the first transceiver module and data received from the network module to the access terminal in an appropriate sequence. Furthermore, a communications apparatus is described below, wherein the apparatus comprises means for determining that an access terminal has requested a handoff from a first transceiver module to a second transceiver module, wherein the communications apparatus comprises the second transceiver module, and means for receiving data from the first transceiver module and an indication of what data should be next transmitted to the access terminal. The apparatus can also include means for receiving data from a network module, wherein the data is desirably transmitted to the access terminal, and means for transmitting data to the access terminal in an appropriate sequence, the data is received from the first transceiver module and the network module. In yet another aspect, a processor can be configured to execute instructions for receiving data from a first transceiver module, wherein the data received from the first transceiver module is associated with sequence information, receiving data from a network module, wherein the data received from the network module is associated with sequence information, and transmitting data received from the first transceiver module and the network module to an access terminal in a correct sequence.

Still further, as described in more detail below, a method for handoff at a network module can comprise receiving an indication that an access terminal has requested a handoff from a first transceiver module to a second transceiver module and indicating to a plurality of transceiver modules that the access terminal is now being serviced by the second transceiver module. Additionally, a communications apparatus can comprise a memory that includes instructions for receiving an indication that an access terminal has requested a handoff from a first transceiver module to a second transceiver module and further instructions for indicating to the first transceiver module and the second transceiver module that the second transceiver module is now servicing the access terminal. The communications apparatus also includes a processor that is configured to execute the instructions. Moreover, in accordance with still another aspect, a computer readable medium can comprise computer executable instructions for determining that an access terminal has requested a handoff from a first transceiver module to a second transceiver module and indicating to a plurality of transceiver modules that the second transceiver module is transmitting data over a forward link to the access terminal.

Additionally, as described below, a communications apparatus can include means for receiving an indication that an access terminal has requested a handoff from a first transceiver module to a second transceiver module and means for providing a plurality of transceiver modules with a message that indicates that the second transceiver module is servicing the access terminal. In another aspect, a processor can be configured to execute instructions for determining that an access terminal has requested a handoff from a first transceiver module to a second transceiver module and informing a plurality of access terminals that the second transceiver module is servicing the access terminal.

To the accomplishment of the foregoing and related ends, certain illustrative aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
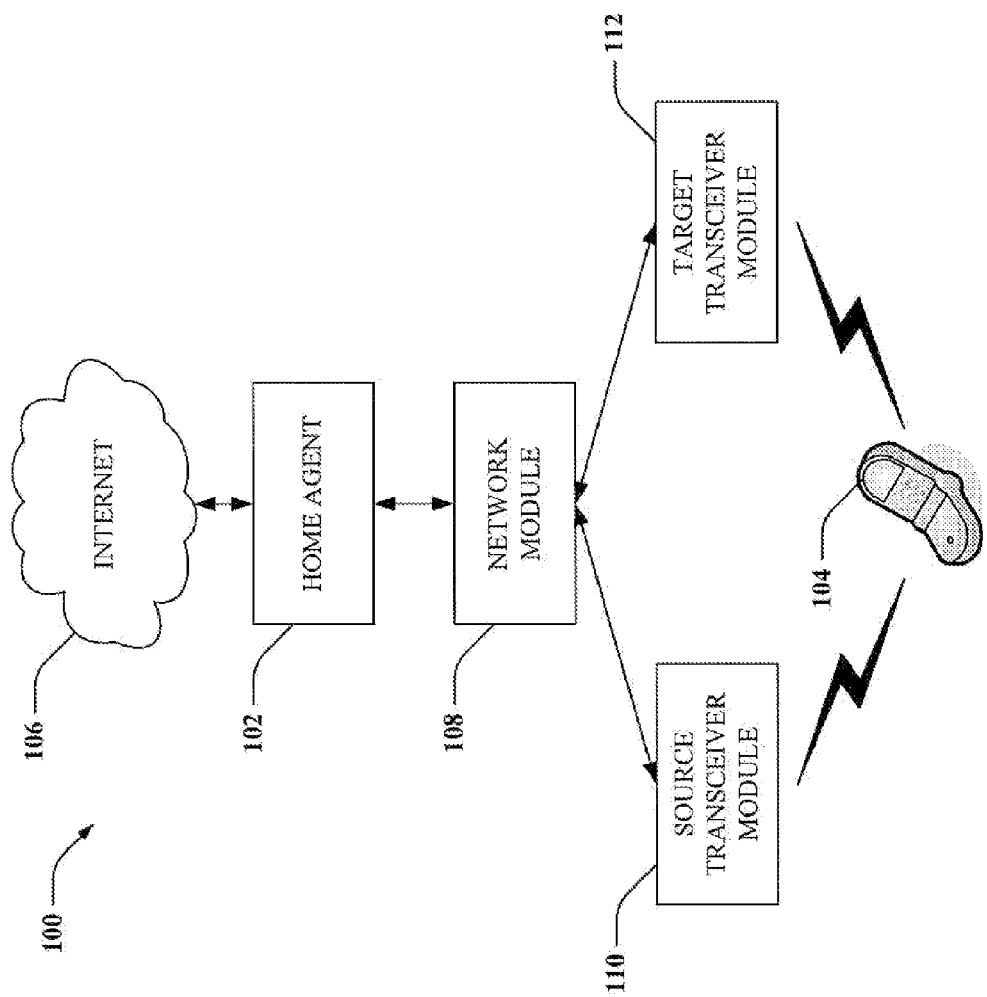
FIG. 1 is an example high-level block diagram of a tiered system architecture.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such subject matter may be practiced without these specific details. In other instances, well-known structures and devices are shown in block diagram form in order to facilitate describing the disclosed subject matter.

Furthermore, various embodiments are described herein in connection with an access terminal. An access terminal can also be called a system, a subscriber unit, subscriber station, mobile station, user equipment, mobile device, remote station, remote terminal, user terminal, terminal, user agent, or user device. For example, an access terminal can be a cellular telephone, a cordless telephone, a Session Initiation Protocol (SIP) phone, a wireless local loop (WLL) station, a PDA, a handheld device having wireless connection capability, a processor within a mobile device, or other processing device connected to a wireless modem.

Moreover, aspects of the disclosed subject matter may be implemented as a method, apparatus, or article of manufacture using standard programming and/or engineering techniques to produce software, firmware, hardware, or any combination thereof to control a computer to implement various aspects described herein. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, it can be recognized that many modifications may be made to this configuration without departing from the scope or spirit of what is described herein.

Turning now to the drawings, FIG. 1 illustrates a network architecture 100 that can be utilized in association with performing framing of data packets at a network edge. Additionally, a protocol is described herein that defines how frames are transmitted during a handoff of an access terminal from a first transceiver module to a second transceiver module. Architecture 100 includes a home agent 102, which can be a router on a home network of an access terminal 104 that maintains information regarding the routing of packets received from the Internet 106 to the access terminal 104. Pursuant to an example, home agent 102 can utilize tunneling mechanisms to forward data from the Internet 106, thereby not requiring an IP address of access terminal 104 to alter each time access terminal 104 connects to the home network from a different location.

Architecture 100 additionally includes a network module 108 that provides an Internet attachment point to access terminal 104. Network module 108 is communicatively coupled to at least one transceiver module. In the example architecture 100, network module 108 is communicatively coupled to a source transceiver module 110 and a target transceiver module 112, wherein transceiver modules 110 and 112 provide an air interface attachment for access terminal 104. Access terminal 104 can request a handoff from source transceiver module 110 to target transceiver module 112 (e.g., due to changing radio conditions). Conventionally, in tiered architectures (such as architecture 100), network module 108 generates data packets and fragments and frames the data packets in a manner suitable for transmission by transceiver modules 110 and 112. When a handoff is requested by access terminal 104 from source transceiver module 110 to target transceiver module 112, one of such transceiver modules will inform network module 108, which will then begin transmitting frames to target transceiver module 112.

In some network designs, however, it may be desirable for transceiver modules to receive data packets created by network module 108 and then perform framing and fragmenting of such data packets; thus, framing and fragmenting can be undertaken at a network edge (at transceiver modules). In such a design, network module 108 can stamp data packets with a sequence number prior to relaying the data packets to transceiver modules, thereby enabling transceiver modules to determine sequence of transmittal of data packets. Therefore, transceiver modules 110 and 112 and network module 108 must communicate with one another to provide data packets, partial data packets, and/or frames to access terminal 104 in a desired sequence in such a system design.

Accordingly, a protocol is described herein that defines actions undertaken by access terminal 104, network module 108, and source and target transceiver modules 110 and 112 when access terminal 104 requests a handoff from a transceiver module currently serving access terminal 104 (source transceiver module 110) to a transceiver module that is desirably serving access terminal 104 (target transceiver module 112). In more detail, source transceiver module 110 can be configured to receive data packets from network module 108 that are intended for access terminal 104, and can fragment the data packets and frame portions thereof in accordance with the Radio Link Protocol (RLP), for example. Source transceiver module 110 can then transmit physical layer frames over a forward link to access terminal 104. Access terminal 104 monitors strength of signals received from source transceiver module 110 (as well as strength of signals associated with other transceiver modules). Therefore, access terminal 104 may request a handoff from source transceiver module 110 to target transceiver module 112 (at least for data provided over a forward link) if signal strength associated with target transceiver module 112 becomes greater than signal strength associated with source transceiver module 110.

In a detailed example, access terminal 104 can create a channel quality indicator (CQI) report and can transmit such report to source transceiver module 110 and/or target transceiver module 112. The CQI report can include an indication of which transceiver module it wishes to be served by. Thus, when access terminal desires a handoff from source transceiver module 110 to target transceiver module 112, it can create and transmit a CQI report that, rather than indicating source transceiver module 110 as a desired serving module, can indicate target transceiver module 112 as a desired serving module. It is understood that access terminal 104 can periodically generate CQI messages and transmit such CQI messages to several transceiver modules, such that the transceiver modules will be aware of existence of access terminal 104 in a location proximate to transceiver modules that receive the CQI messages.

If target transceiver module 112 receives a switch request prior to source transceiver module 110 receiving the switch request, target transceiver module 112 can indicate to network module 108 and source transceiver module 110 of the handoff request. In response to being informed of the handoff request, source transceiver module 110 can provide target transceiver module 112 with data that has been received by source transceiver module 110 for desired transmittal to access terminal 104, but has yet to be transmitted. Such data can be in the form of an entire data packet (associated with a sequence number assigned to the data packet by network module 108), a partial data packet (associated with a sequence number assigned by network module 108), and/or physical layer frames that were created from a data packet. Additionally, source transceiver module 110 can indicate which portion of a data packet should be subject to RLP framing and transmittal next in time.

Furthermore, in one aspect, source transceiver module 110 can provide an indication to network module 108 that source transceiver module 110 is no longer serving access terminal 104 and that target transceiver module 112 is serving access terminal 104. Additionally, source transceiver module 110 can indicate to network module 108 an identity of a most recently received data packet, thereby enabling network module 108 to provide target transceiver module 112 with a data packet that is next in a sequence. In another example, source transceiver module 110 can indicate (to network module 108) which data packets source transceiver module 110 has forwarded to target transceiver module 112, as it may be more efficient to have data packets forwarded by network module 108 rather than source transceiver module 110. In other words, source transceiver module 110 and network module 108 can interact to ensure that duplicative data is not delivered to target transceiver module 112. Target transceiver module 112 can receive data for transmission from source transceiver module 110 and network module 108 and can additionally receive indications of sequence of transmission such that a seamless handoff occurs and data is transmitted to access terminal 104 in an appropriate order.

As can be understood, various permutations to the protocol described above can be contemplated and are intended to fall under the scope of the hereto-appended claims. For instance, source transceiver module 110 can receive an indication that access terminal 104 is requesting handoff to target transceiver module 112 prior to target transceiver module 112 receiving such indication. Source transceiver module 110 can accordingly indicate the handoff to target transceiver module 112 and provide data to target transceiver module 112 for transmittal to access terminal 104. The crux of the disclosed subject matter revolves around handling of states of data during a handoff of access terminal 104 from source transceiver module 110 to target transceiver module 112.

Figure 2:
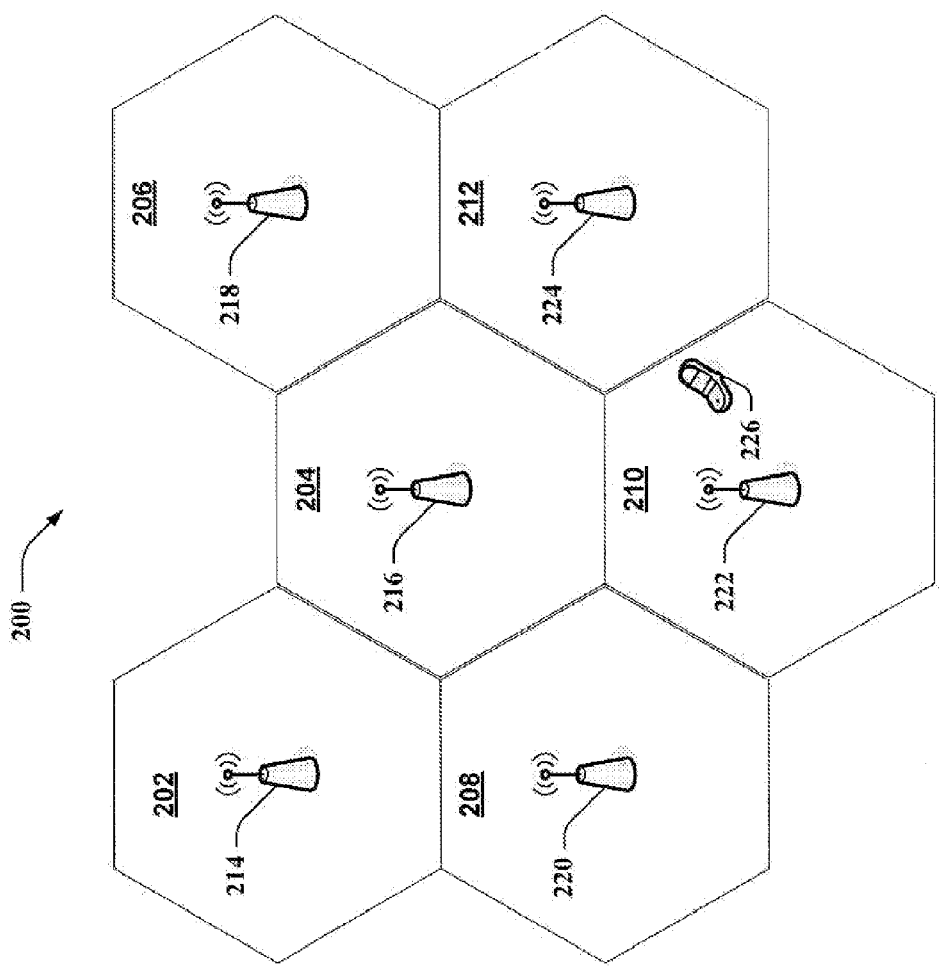
FIG. 2 is an example wireless communications environment.

Now turning to FIG. 2, an example wireless communications system 200 is illustrated. The system 200 includes a plurality of sectors 202-212, wherein an access terminal can employ wireless services within such sectors 202-212. While the sectors 202-212 are shown as being hexagonal in nature and of substantially similar size, it is understood that size and shape of sectors 202-212 can vary depending upon geographical region, number, size, and shape of physical impediments, such as buildings, and several other factors. Access points 214-224 are associated with sectors 202-212, wherein access points 214-224 are utilized to provide services to user equipment within sectors 202-212. Access points 214-224 can be or comprise transceiver modules as well as network modules. For instance, access points 214-224 can be base stations and/or wireless routers that comprise transceiver modules and/or network modules. Each of the access points 214-224 can simultaneously provide service to several access terminals. In the system 200, access terminal 226 is associated with sector 210 and thus can be serviced by access point 222. Access terminal 226, however, may be portable and can therefore transition to disparate sectors (e.g., be subject to handoff between access points). The access points 214-222 can be configured to communicate state of data amongst one another to facilitate efficiently handing off access terminal 226 amongst access points.

In a particular example, access terminal 226 can be communicatively coupled to access point 222, and access point 222 can include a transceiver module (not shown) that receives data packets and converts such packets into physical layer frames for transmission to access terminal. The data packets can be received from a network module (not shown), which can reside within access point 222, a different access point, and/or within a network server not resident within access points 214-224. The network module can provide a sequence number to data packets provided to a transceiver module associated with access point 222, such that access point 222 can transmit data to access terminal 226 in a desired sequence.

Due to alterations in signal quality (which can arise from transitioning of access terminal 226 over a geographical area), access terminal 226 can request a handoff from access point 222 to access point 224. In an example, the request can be indicated within a CQI report that is transmitted to access point 222, access point 224, and/or other access points that are at least somewhat proximate to access terminal 226. Upon receiving the indication (from a transceiver module associated with access point 222, network module, or access terminal 226), a transceiver module associated with access point 222 can provide at least a partial data packet to a transceiver module associated with access point 224, as well as an indication as to what data to next provide access terminal 226. Access point 224 can then provide appropriate data in an appropriate sequence (received from access point 222 as well as a network module) to access terminal 226.

Figure 3:
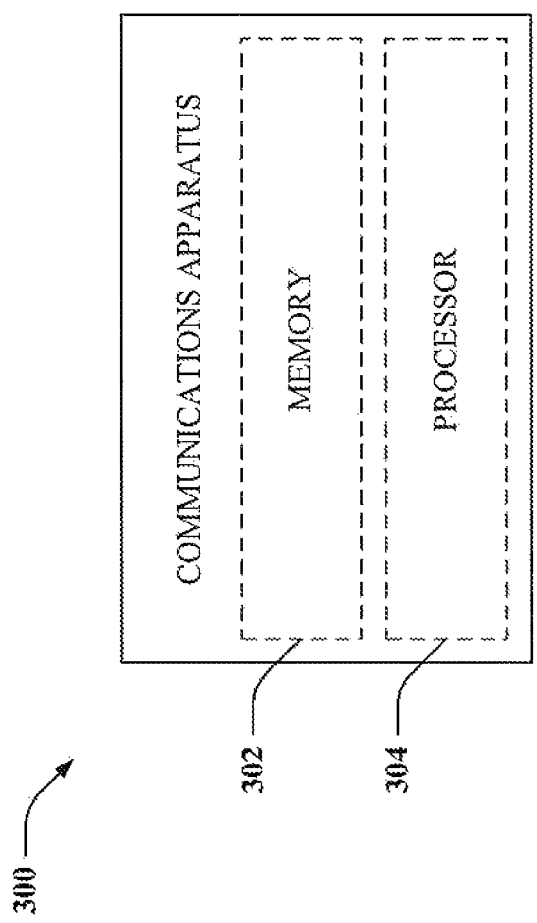
FIG. 3 is an example apparatus that facilitates handling of data desirably transmitted to an access terminal during a handoff.

Now referring to FIG. 3, a communications apparatus 300 for employment within a wireless communications environment is illustrated. The apparatus 300 can be a base station or a portion thereof, a router or a portion thereof, a switch or a portion thereof, a gateway or a portion thereof, etc. Apparatus 300 can include a memory 302 that retains various instructions with respect to providing data to an access terminal over a forward link in an appropriate sequence. For instance, if apparatus 300 is a network module, memory 302 can include instructions for receiving an indication that an access terminal has requested a handoff from a first transceiver module to a second transceiver module. Such indication can be received from one or more of the first transceiver module, the second transceiver module, or another transceiver module. Memory 302 can further include instructions for determining identity of the second transceiver module (e.g., the transceiver module that is requested to service the access terminal). Pursuant to an example, the second transceiver module can be identified through analyzing an Internet Protocol (IP) address associated therewith. Any suitable manner for identifying transceiver modules, however, is contemplated and intended to fall under the scope of the hereto appended claims. Memory 302 can also comprise instructions for indicating to a plurality of transceiver modules that the access terminal is being serviced by the second transceiver module. Communications apparatus 300 can further include a processor 304 that is configured to execute the instructions.

In another example, communications apparatus 300 can be a source transceiver module. In such an instance, memory 302 can include instructions for receiving data from a network module for framing and transmission to an access terminal and transmitting framed data over a physical channel to the access terminal. Memory 302 can further comprise instructions for receiving an indication that the access terminal being serviced by the source transceiver module has requested a handoff from the source transceiver module to a target transceiver module. Still further, memory 302 can include instructions for forwarding a partial data packet to the target transceiver module upon receiving the indication. Again, processor 304 can be configured to execute such instructions.

In yet another example, communications apparatus 300 can be a target transceiver module. In such case, memory 302 can comprise instructions for receiving data from a source transceiver module, wherein the data is desirably transmitted to an access terminal. In an example, the data can be a full data packet, a partial data packet, a physical layer frame, and/or the like. Memory 302 can also include instructions for receiving an indication of what portion of the received data should be next transmitted to the access terminal. Pursuant to an example, a pointer can be placed within a data packet, wherein the pointer is utilized to illustrate which portion of the data packet to initially transmit to the access terminal (such that the access terminal receives data in an appropriate order). Memory 302 can also comprise instructions for receiving data from a network module, wherein the data is desirably transmitted to the access terminal. For instance, such data can be in the form of IP-encapsulated data packets. Memory 302 can additionally include instructions for selectively ordering and transmitting data received from the second transceiver module and the network module to the access terminal. Processor 304 can be configured to execute such instructions.

Referring to FIGS. 4-7, methodologies relating to transmitting data over a forward link to an access terminal are illustrated. While, for purposes of simplicity of explanation, the methodologies are shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 4:
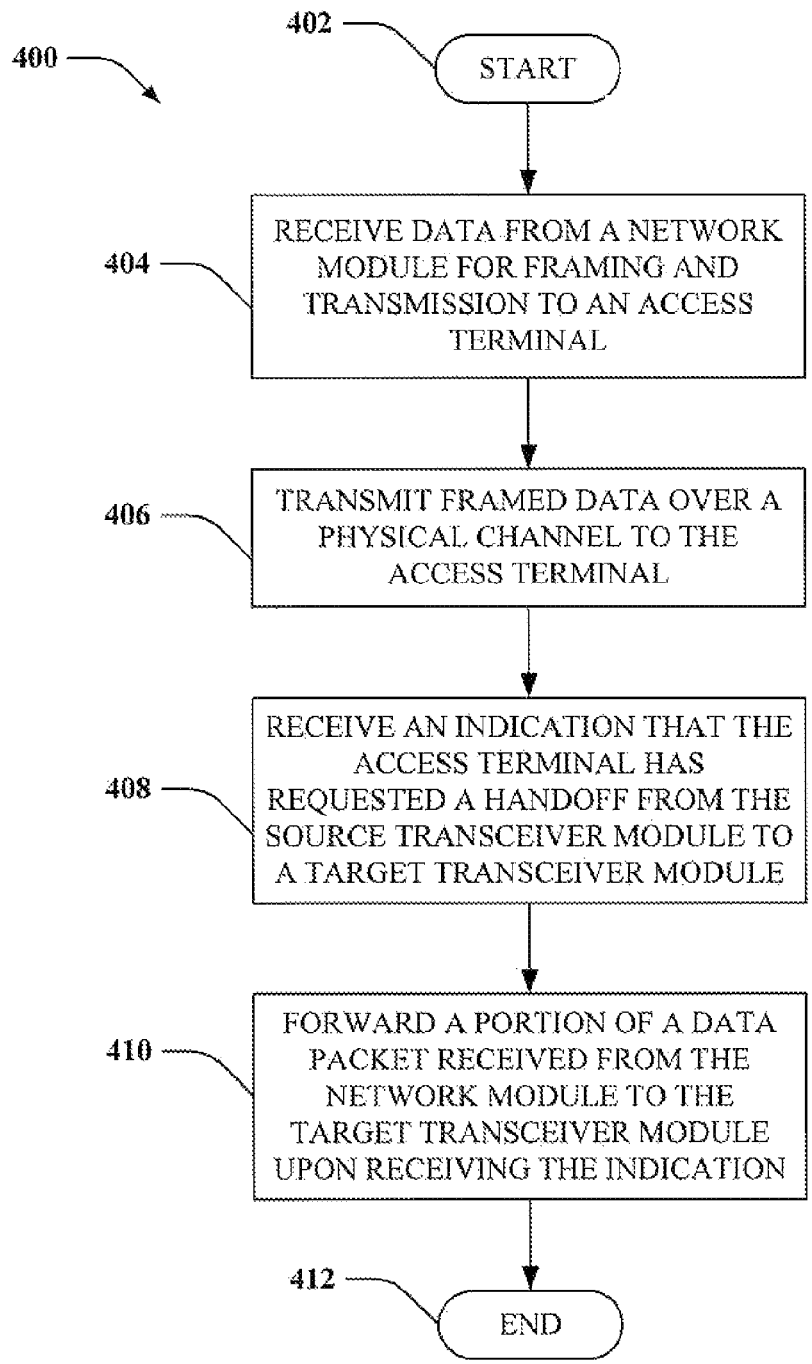
FIG. 4 is a representative flow diagram illustrating an example methodology for forwarding a partial data packet to a target transceiver module.

Referring solely to FIG. 4, a methodology 400 for forwarding one or more partial data packet and/or one or more data packets from a first transceiver module to a second transceiver module is illustrated. The methodology 400 starts at 402, and at 404 data from a network module is received for fragmenting, framing, and transmission to an access terminal. In more detail, a first transceiver module that is currently servicing an access terminal can receive IP-encapsulated data packets from a network module, wherein such data is desirably transmitted from the first transceiver module to the access terminal. Additionally, the IP-encapsulated data packets can be associated with stamps that indicate sequence associated with the data packets. The first transceiver module can then access the data packets and create physical frames for transmission.

At 406, framed data is transmitted over a physical channel to the access terminal. At 408, an indication is received that the access terminal desires a handoff from the first transceiver module to the second transceiver module. For instance, such indication can be received from the access terminal, wherein the indication is provided within a CQI report or other suitable message. In another example, the indication can be received from the second transceiver module (which received the indication from access terminal). In yet another example, the network module can inform the first transceiver module of the request for handoff if the network module receives the indication of the request prior to the first transceiver module being aware of the request. At 410, a portion of a data packet received from the network module is forwarded to the second transceiver module for transmission to the access terminal, wherein such portion of the data packet is forwarded upon the first transceiver module receiving the indication of the handoff request. In additional, portions of other data packets as well as complete data packets can be from the first transceiver module to the second transceiver module. In an example, a portion of a data packet can be provided to the second transceiver module in the form of a message, wherein the message can additionally include information relating to a sequence number associated with the data packet as well as where to begin framing and transmitting the portion of the data packet. Thus, data can be provided to the access terminal in an appropriate order. Methodology 400 then completes at 412.

Figure 5:
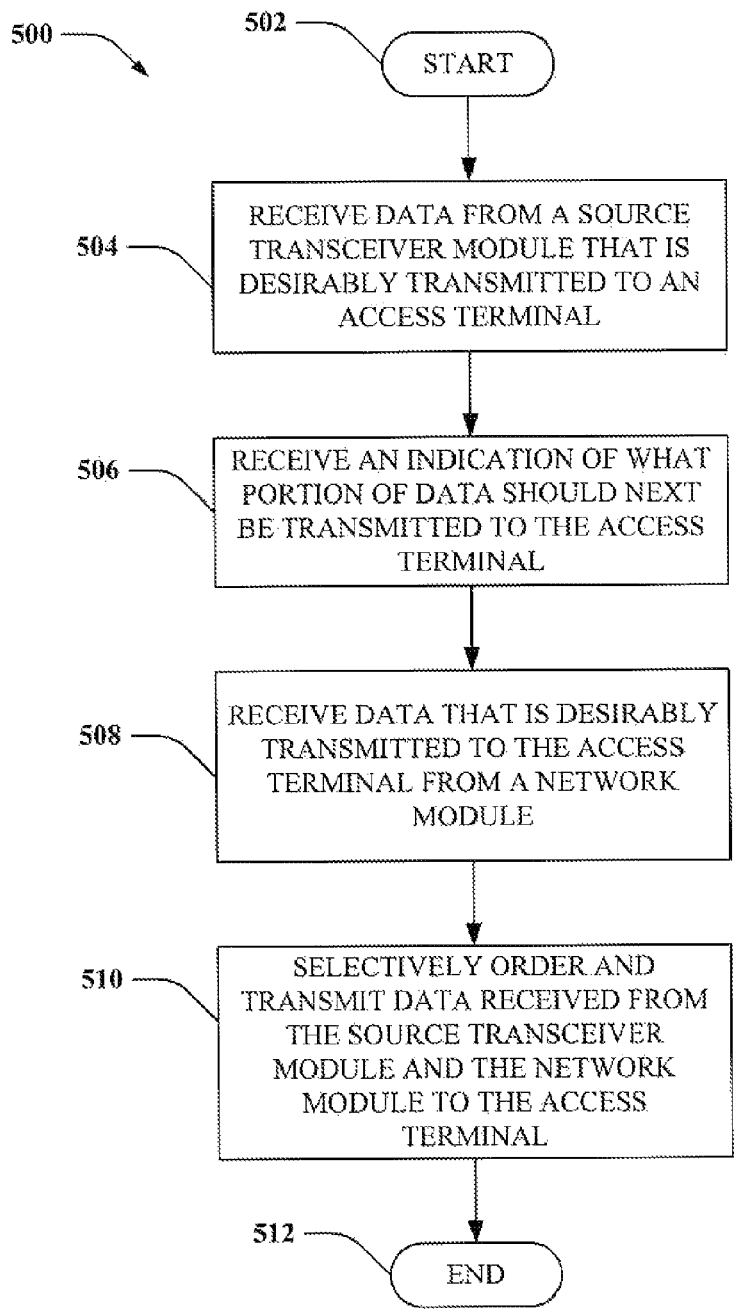
FIG. 5 is a representative flow diagram illustrating an example methodology for ordering and transmitting data to an access terminal.

Turning now to FIG. 5, a methodology 500 for transmitting data received from a source transceiver module and a network module to an access terminal in an appropriate sequence is illustrated. The methodology 500 begins at 502, and at 504 data is received from a source transceiver module that is desirably transmitted to an access terminal. For instance, the access terminal can indicate to the source transceiver module and/or to a target transceiver module that the access terminal desires to handoff from the source transceiver module to the target transceiver module. At 506, an indication of what portion of data should next be transmitted to the access terminal is received. In an example, the source transceiver module can begin framing portions of an IP-encapsulated data packet for transmission to the access terminal over a physical channel. The remainder of the data packet, however, may still need to be framed and transmitted to the access terminal. Accordingly, a portion of the data packet may still need to be transmitted to the access terminal, and such portion as well as where framing and transmission should begin at the target transceiver module can be received at the target transceiver module from the source transceiver module.

At 508, data is received from a network module that is desirably transmitted to the access terminal. For instance, the source transceiver module can indicate to the network module that a particular set of data packets has been provided to the target transceiver module by the source transceiver module. As used herein, a set of data packets can include one or more partial data packets and/or one or more complete data packets. The network module can then provide an appropriate set of data packets (e.g., the next data packets in a sequence), and the target transceiver module does not receive duplicative data packets. At 510, the target transceiver module selectively orders data received from the source transceiver module and the network module and transmits such data to the access terminal. The methodology 500 then completes at 512.

Figure 6:
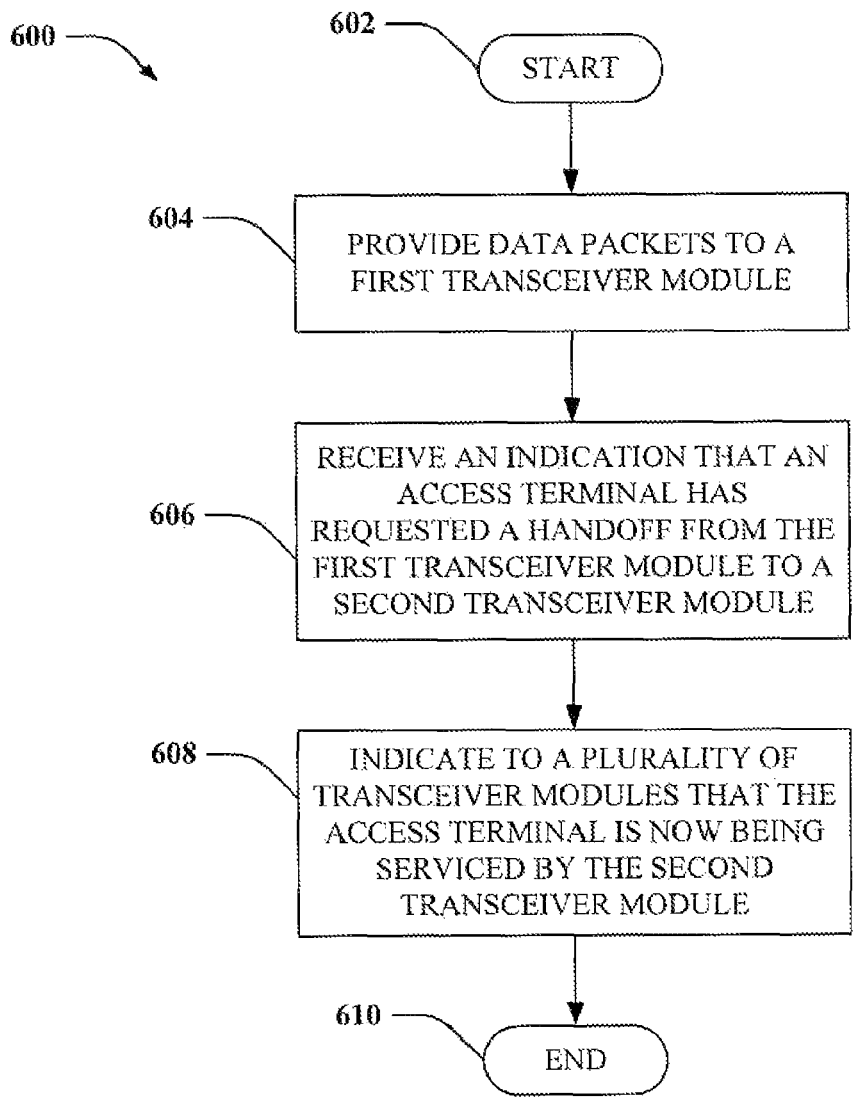
FIG. 6 is a representative flow diagram illustrating an example methodology for indicating to a plurality of transceiver modules an identity of a transceiver module that is servicing an access terminal.

With reference now to FIG. 6, a methodology 600 that relates to provision of data to an access terminal in a wireless communications environment is illustrated. Methodology 600 starts at 602, and at 604 data packets are provided to a first transceiver module. More particularly, a network module can provide IP-encapsulated data packets to the first transceiver module by way of layer 3 tunneling, and the first transceiver module can frame portions of such data packet to enable transmission thereof to the access terminal. At 606, an indication is received that the access terminal has requested a handoff from the first transceiver module to a second transceiver module. At 608, the network module indicates to a plurality of transceiver modules that the second transceiver module is servicing the access terminal. Thus, several transceiver modules will have knowledge of which transceiver module is currently servicing the access terminal. The indication that the second transceiver module is servicing the access terminal can be associated with a sequence number, such that if a plurality of handoffs occurs in a small amount of time, transceiver modules that receive the indication will have knowledge of which indication is most recent. Methodology 600 then completes at 610.

Figure 7:
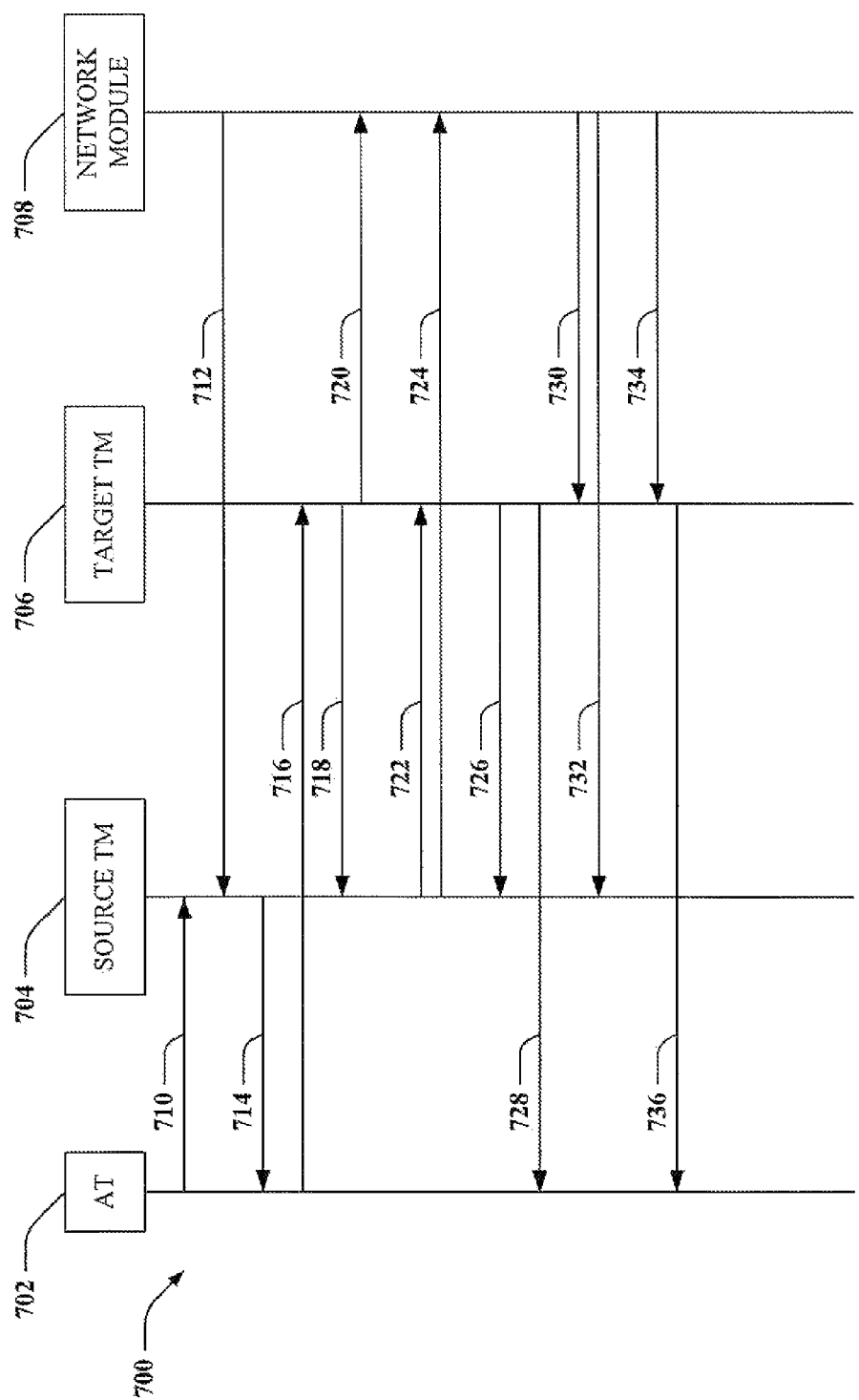
FIG. 7 is an example flow diagram illustrating transition of data and state information amongst modules during a handoff.

Turning now to FIG. 7, a flow diagram 700 illustrating actions undertaken with respect to a handoff is illustrated. The flow diagram 700 illustrates interaction between an access terminal 702, a source transceiver module 704, a target transceiver module 706, and a network module 708 with respect to providing data to access terminal 702 over a forward link before, during, and after a handoff. As described above, network module 708 can provide a point of attachment to the Internet for access terminal 702 and can communicate with source and target transceiver modules 704 and 706, respectively, by way of layer 3 signaling. Source and/or target transceiver modules 704 and 706 can provide an over-the-air (OTA) interface with respect to access terminal 702, and can send and receive data with respect to access terminal 702 by way of layer 2 signaling.

At 710, access terminal indicates to source transceiver module 702 that it desires to be serviced by source transceiver module 704 (e.g., provided with data over a forward link from source transceiver module 704). In an example, access terminal 702 can generate a CQI message, wherein a portion thereof is utilized to identify a transceiver module that is to service access terminal 702. Additionally, while not shown, access terminal 702 can transmit such a message to target transceiver module 706 as well as several other transceiver modules. At 712, network module 708 transmits data by way of layer 3 signaling to source transceiver module for transmittal to access terminal 702. Source transceiver module 704 can receive, for instance, an IP-encapsulated data packet that is associated with a sequence value from network module 708, and source transceiver module 704 can frame portions of such data packet for transmittal to access terminal 702 over a forward link. At 714, source transceiver module 704 can transmit framed data (and a message that indicates forward link assignment parameters such as scheduling parameters) to access terminal 702.

At 716, access terminal 702 indicates to target transceiver module 706 that a handoff is desired from source transceiver module 704 to target transceiver module 706. As before, access terminal 702 can utilize a CQI message to provide the aforementioned indication to target transceiver module 716 (as well as source transceiver module 704 and other transceiver modules). At 718, target transceiver module 706 indicates to source transceiver module 704 that access terminal 702 has requested to be handed off from source transceiver module 704 to target transceiver module 706. Additionally, target transceiver module 706 can inform network module 708 of the request at 720.

At 722, source transceiver module 704 provides target transceiver module 706 with data that has yet to be transmitted to access terminal 702. Pursuant to an example, source transceiver module 704 may have framed and transmitted approximately half of an IP-encapsulated data packet when a handoff request is received. Therefore, source transceiver module 704 can provide the remainder of the data packet to target transceiver module 706 for framing and transmittal. Additionally, a message that indicates that source transceiver module 704 is aware of the request for handoff can be provided to target transceiver module 706. At 724, source transceiver module 704 indicates to network module 708 that the handoff is correct as well as indicating to network module 708 a most recent data packet that was received by source transceiver module 704 and/or transferred to target transceiver module 706. Thus, network module 708 can have knowledge of which data packet should next be provided to target transceiver module 706.

At 726, target transceiver module 706 provides a message to source transceiver module 704 indicating that the handoff has been accepted. At 728, target transceiver module 706 can transmit a forward link assignment message and data to access terminal 702. The data can be data that was forwarded to target transceiver module 706 from source transceiver module 704. At 730 and 732, network module 708 informs target transceiver module 706 and source transceiver module, respectively, that target transceiver 706 is servicing access terminal 702. Further, network module 708 can inform other transceiver modules (not shown) that target transceiver module 706 is servicing access terminal 702. At 734, network module 708 provides at least one IP-encapsulated data packet to target transceiver module 706 for fragmenting, framing, and transmittal to access terminal 702. At 734, target transceiver module 706 can transmit such data (and scheduling and forward link assignment parameters) to access terminal 702. While a particular protocol has been described above, it is understood that some acts may be omitted or be undertaken in a different order than that described.

Figure 8:
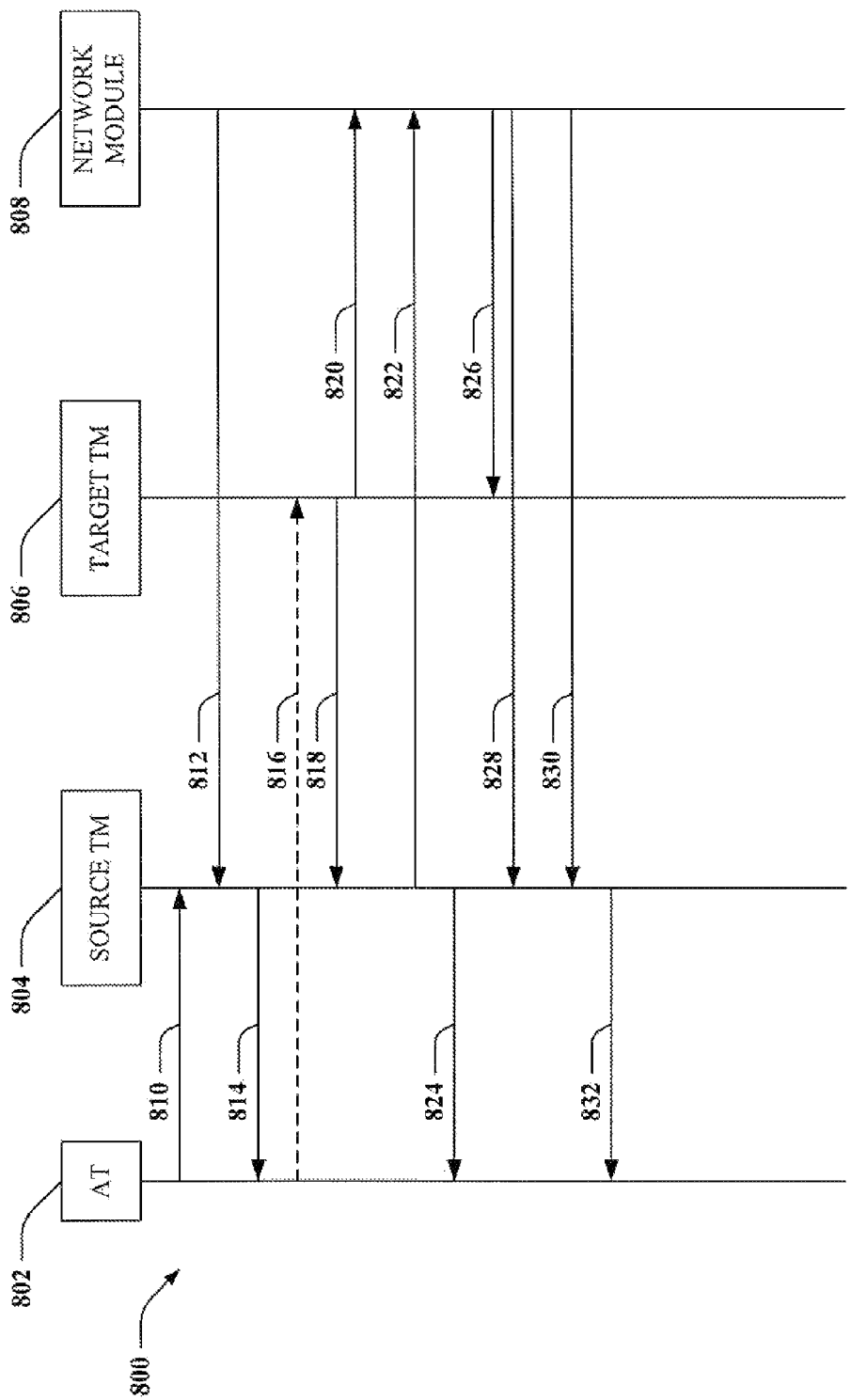
FIG. 8 is an example flow diagram illustrating correcting an improperly decoded request for handoff from an access terminal.

Now referring to FIG. 8, an example flow diagram 800 illustrating communications amongst an access terminal 802, a source transceiver module 804, a target transceiver module 806, and a network module 808 with respect to a handoff is illustrated. In this example flow diagram 800, target transceiver module 806 incorrectly receives or decodes a message from access terminal that access terminal 802 wishes to be handed off from source transceiver module 804 to target transceiver module 806. At 810, access terminal can generate a CQI report and transmit the CQI report to source transceiver module 804 (and, possibly target transceiver module 806 and other transceiver modules). The CQI report can include an indication of which transceiver module desirably services access terminal 802. At 812, network module 808 can provide data packets to source transceiver module 804 for transmission to access terminal 802. Each data packet can be stamped with a sequence number, such that source transceiver module 804 can transmit physical frames to access terminal 802 in a desired order. At 814, source transceiver module 804 transmits scheduling information and/or data to access terminal 802. At 816, target transceiver module (incorrectly) receives an indication from access terminal 802 that access terminal 802 wishes to be serviced by target transceiver module 806. At 818, target transceiver module 806 can inform source transceiver module 804 of the received request, and at 820 target transceiver module 806 can inform network module 808 of the received request. Meanwhile, however, source transceiver module 804 can be receiving CQI reports from access terminal 802, wherein such reports indicate that, in actuality, access terminal 802 desires that source transceiver module 804 services access terminal 802.

Therefore, at 822 source transceiver module 804 can provide a message to network module 808 indicating that access terminal 802 desires to be serviced by source transceiver module 804, and at 824 can transmit data and scheduling information over a forward link to access terminal 802. In an example, source transceiver module 804 can format data in accordance with RLP. Network module 808 can inform target transceiver module 806, source transceiver module 804, and possibly other transceiver modules that source transceiver module 804 is servicing access terminal 802 at 826 and 828, respectively. Thereafter, at 830 network module 808 can provide source transceiver module 804 with IP-encapsulated data packets intended for access terminal 802. At 832, source transceiver module 804 can transmit data received from network module 808 to access terminal 802.

Figure 9:
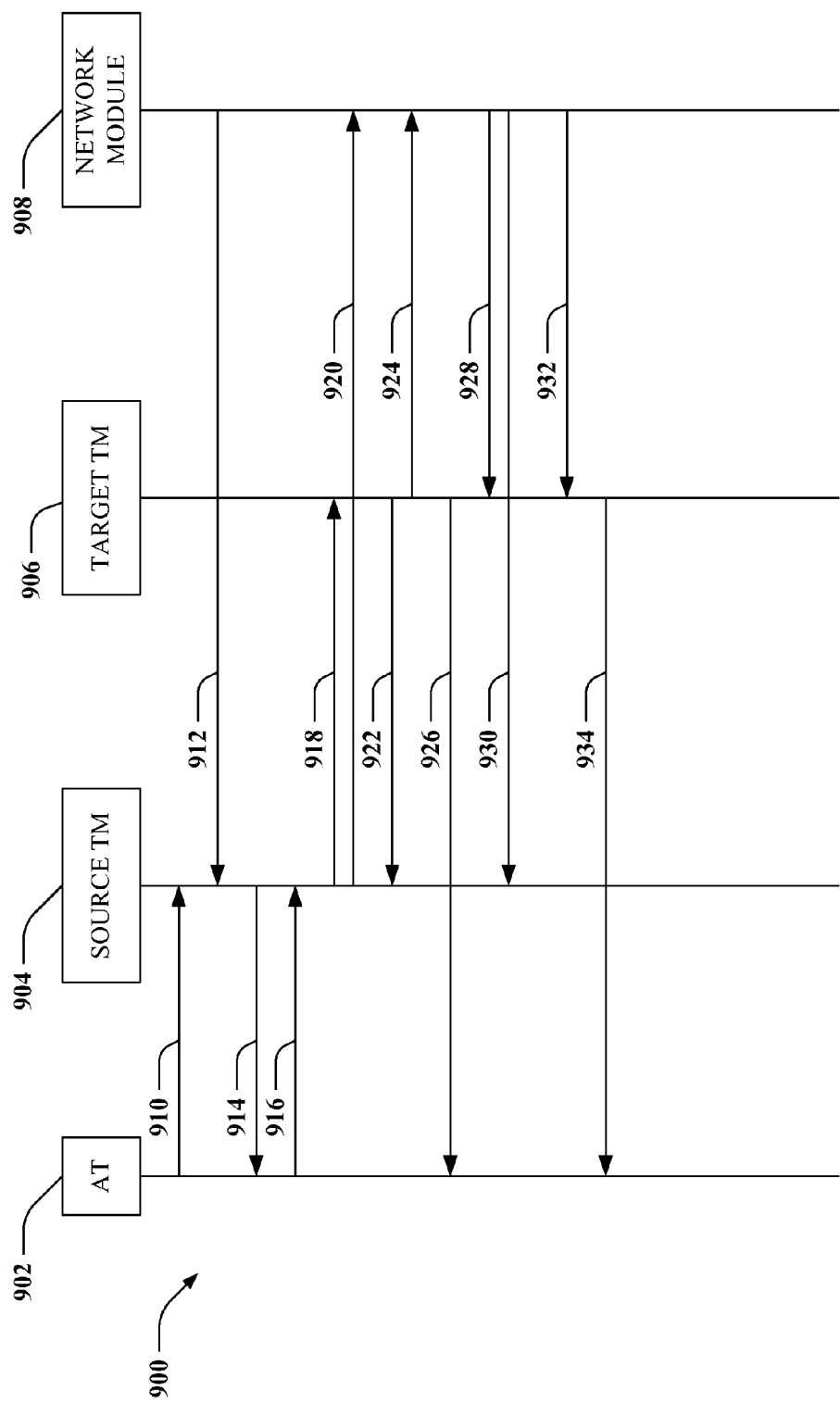
FIG. 9 is an example flow diagram illustrating transition of data and state information amongst modules during a handoff.

With reference now to FIG. 9, an example flow diagram 900 illustrating actions undertaken by an access terminal 902, a source transceiver module 904, a target transceiver module 906, and a network module 908 when the source transceiver module 904 initially receives a request for a handoff is provided. At 910, access terminal indicates that access terminal is desirably serviced by source transceiver module 904 (e.g., indicating as much in a CQI message). At 912, network module 908 provides at least one IP-encapsulated data packet to source transceiver module for transmittal to access terminal 902, and at 914 source transceiver module 904 frames and transmits at least a portion of a data packet to access terminal 902.

At 916, access terminal 902 indicates that access terminal 902 desires to be serviced by target transceiver module 906, and source transceiver module 904 can receive such indication. At 918, source transceiver module informs target transceiver module 906 of the handoff request by providing target transceiver module 906 with data that is desirably transmitted to access terminal 902. As before, source transceiver module 904 can provide an indication of which data target transceiver module 906 should begin transmitting to access terminal 902. In another example, source transceiver module 904 can provide target transceiver module 906 with a partial data packet, and target transceiver module 906 can begin transmitting accordingly.

At 920, source transceiver module 904 informs network module 908 of the handoff request and indicates to network module which data packet was provided to target transceiver module 906. At 922, target transceiver module 906 indicates to source transceiver module 904 that the request for handoff to target transceiver module 906 has been received, and at 924 target transceiver module 906 informs network module 908 that it will be servicing access terminal 902. At 926, target transceiver module 906 transmits data received from source transceiver module 904 to access terminal and/or informs access terminal 926 that target transceiver module 906 will be servicing access terminal 902. At 928 and 930 network module 908 indicates to target transceiver module 906 and source transceiver module 904, respectively, that target transceiver module 906 is servicing access terminal 902. Additionally, a network module 908 can provide such indication to other transceiver modules that are not shown. At 932, network module 908 provides IP-encapsulated data packets to target transceiver module 906 for transmittal to access terminal 902, and at 934 target transceiver module 906 frames and transmits the data to access terminal 902.

Figure 10:
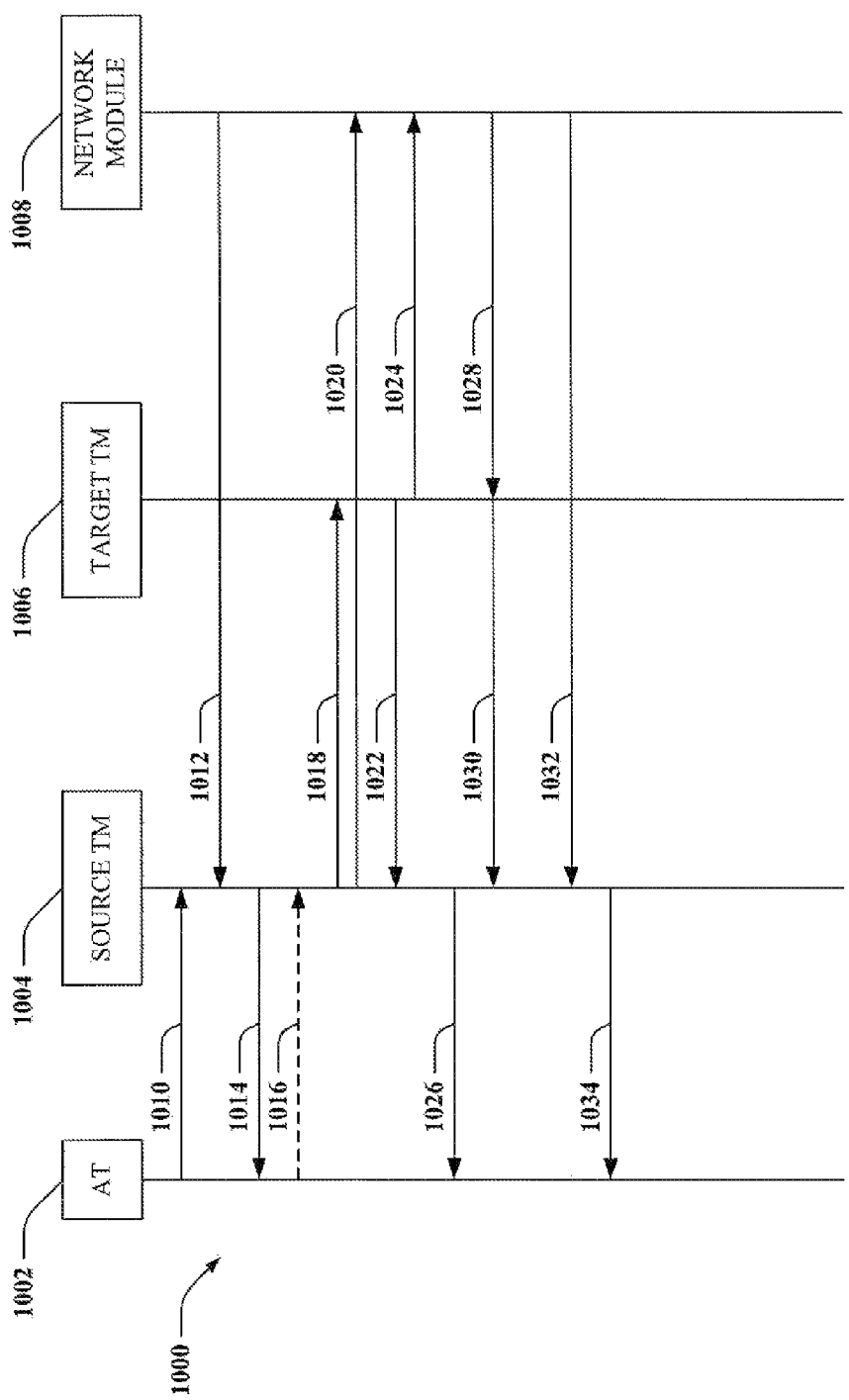
FIG. 10 is an example flow diagram illustrating correcting and improperly decoded request for handoff from an access terminal.

Now referring to FIG. 10, an example flow diagram 1000 illustrating actions taken by an access terminal 1002, a source transceiver module 1004, a target transceiver module 1006, and a network module 1008 when the source transceiver module 1004 incorrectly demodulates a handoff request is shown. At 1010, access terminal 1002 indicates to source transceiver module 1004 (e.g., by way of a CQI report) that it desires source transceiver module 1004 to provide data to access terminal 1002 over a forward link. At 1012, network module 1008 provides data to source transceiver module 1004 (by way of layer 3 tunneling) for transmittal to access terminal, and at 1014 source transceiver module 1004 frames data in accordance with RLP and transmits such data to access terminal 1002.

At 1016, source transceiver module 1004 incorrectly decodes a handoff request from access terminal 1002, wherein source transceiver module 1004 believes that access terminal 1002 is requesting a handoff to target transceiver module 1006. At 1018, source transceiver module informs target transceiver module 1006 to the handoff request and provides data (e.g., at least a partial data packet) to target transceiver module 1006. Additionally, at 1020 source transceiver module 1004 indicates to network module 1008 of the handoff request and informs network module 1008 of a last data packet transmitted to access terminal 1002. At 1022, target transceiver module 1006 rejects the handoff request and informs source transceiver module 1004 of such rejection. For instance, target transceiver module 1006 can receive CQI reports from access terminal 1002, wherein a portion of such report can indicate which transceiver module should service access terminal 1002. Therefore, target transceiver module 1006 can know that access terminal 1002 does not desire to be serviced by target transceiver module 1006, and can inform source transceiver module 1004 accordingly. At 1024, target transceiver module 1006 indicates to network module 1008 that the handoff request has been denied.

At 1026, source transceiver module 1004 can commence providing data to access terminal 1002. For instance, source transceiver module 1004 may have a transmission buffer, such that data provided to target transceiver module 1006 is at least temporarily retained at source transceiver module 1004. At 1028 and 1030, network module 1008 can inform both target transceiver module 1006 and source transceiver module 1004 that the handoff has failed, and that source transceiver module 1004 is servicing access terminal 1002. At 1032, network module 1008 provides source transceiver module 1004 with data that is desirably transmitted to access terminal 1002, and at 1034 source transceiver module 1004 transmits data to access terminal 1002.

Figure 11:
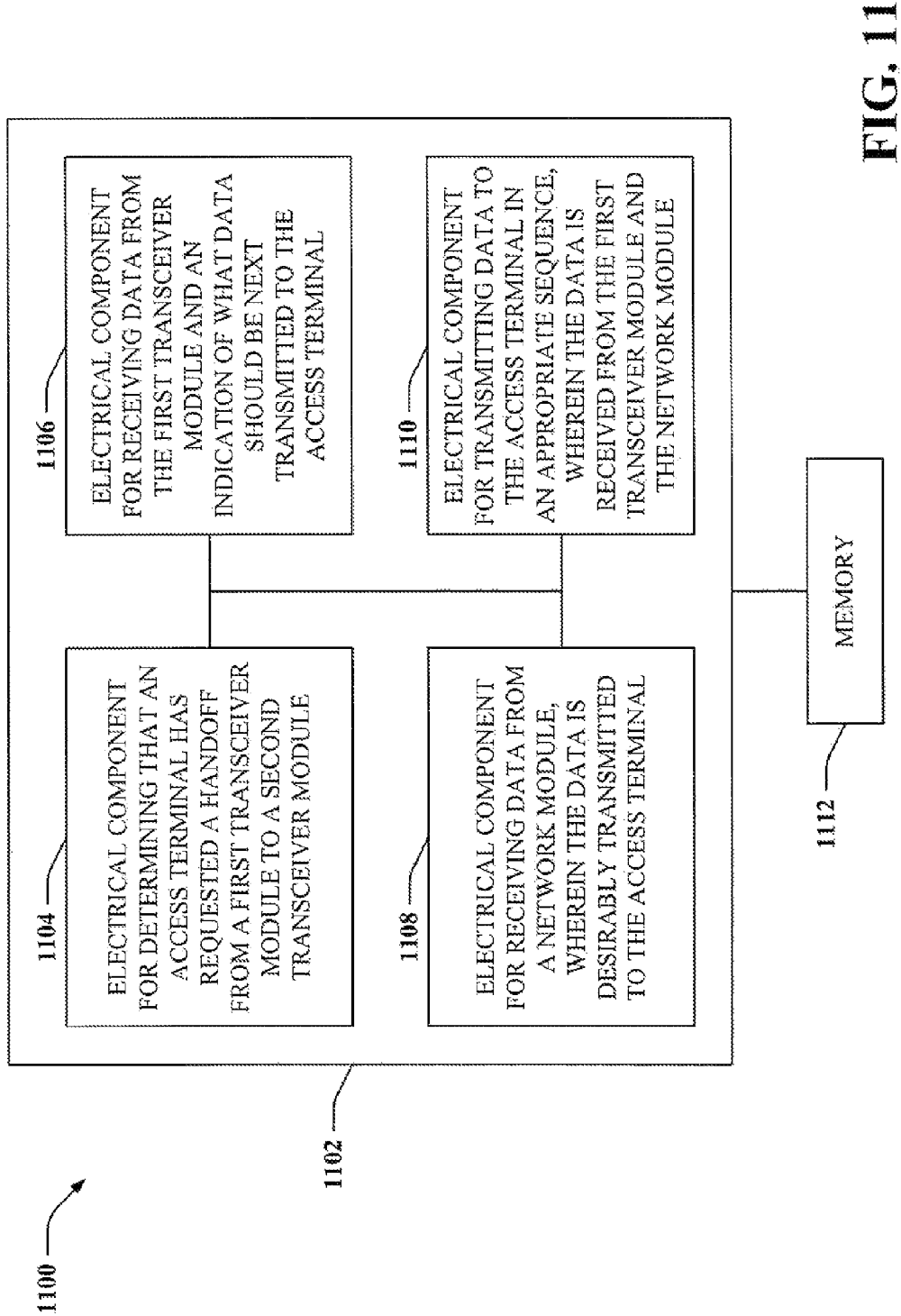
FIG. 11 is an example system that facilitates transmitting data to an access terminal in an appropriate sequence before and after a handoff.
Figure 12:
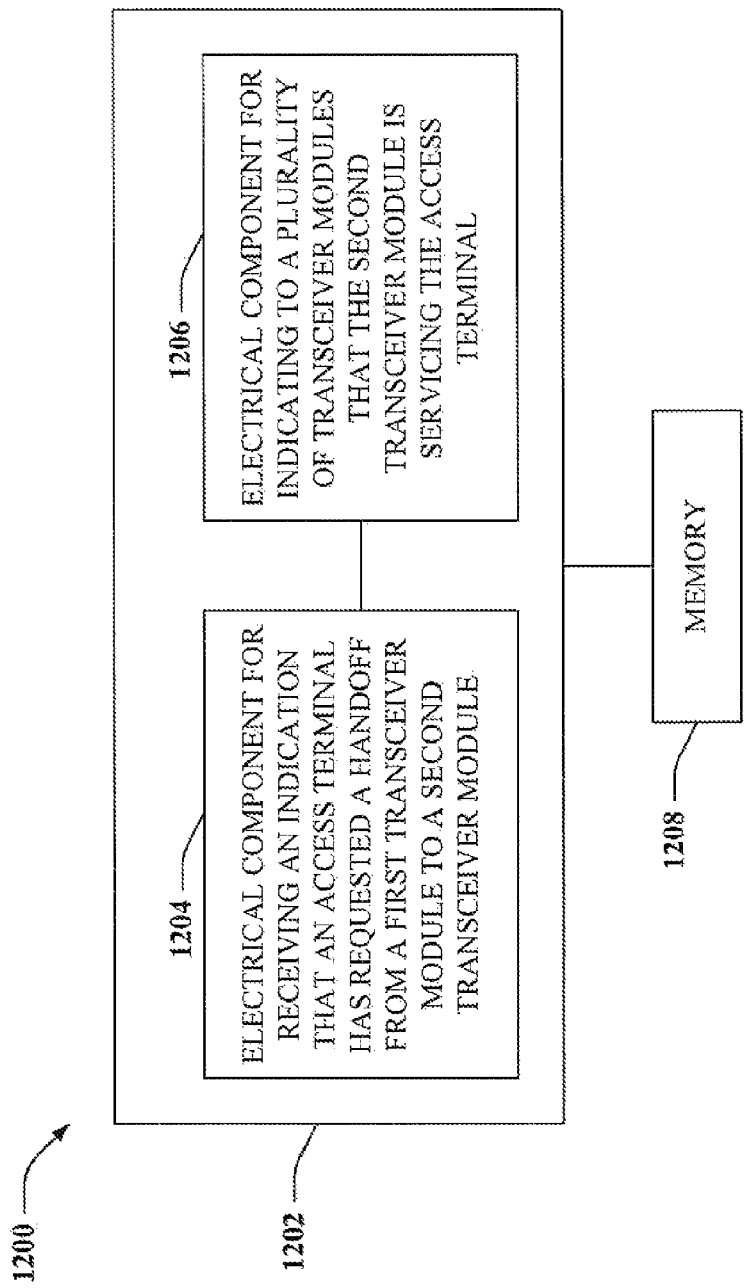
FIG. 12 is an example system that facilitates informing a plurality of transceiver modules that a particular transceiver module is providing forward link services to an access terminal.
Figure 13:
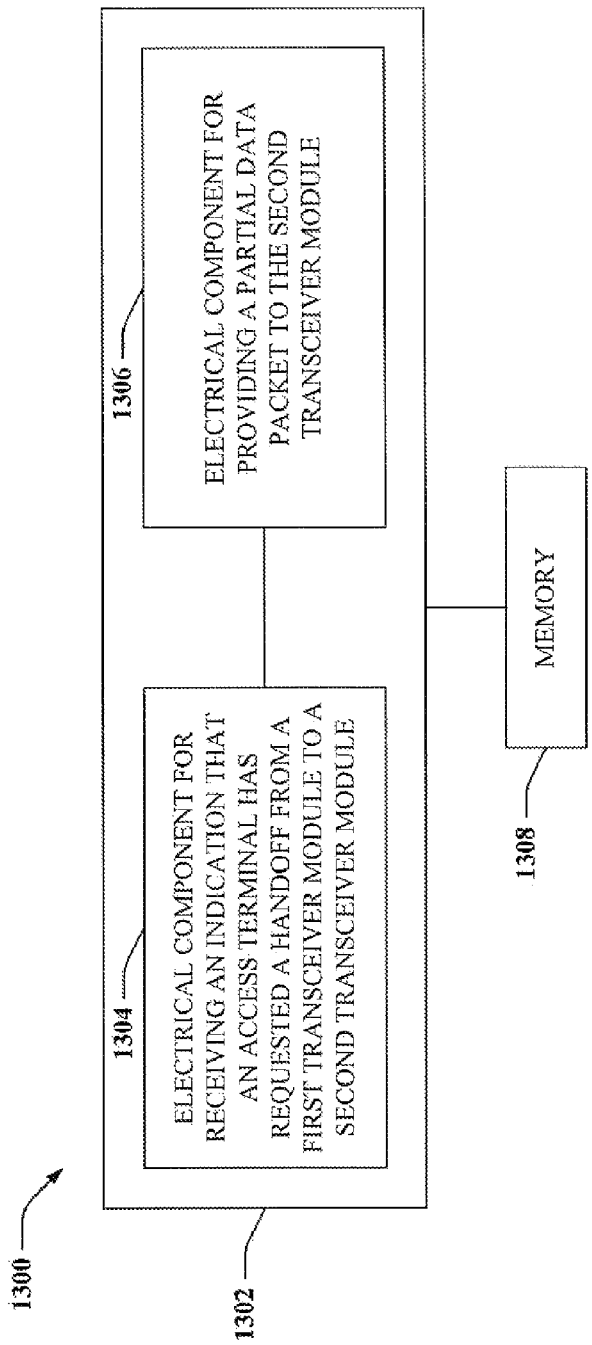
FIG. 13 is an example system that facilitates providing a partial data packet to a transceiver module.

Now referring collectively to FIGS. 11-13, systems 1100, 1200, and 1300 are illustrated, wherein such systems relate to informing network entities of state of data during a handoff. It is to be appreciated that systems 1100, 1200, and 1300 are represented as including functional blocks, wherein such blocks can represent functions implemented by a processor, software, or a combination thereof (e.g., firmware).

Turning specifically to FIG. 11, a system 1100 that facilitates transmittal of data to an access terminal in a proper sequence when a handoff is requested is illustrated. In an example, system 1100 can reside within an access point and/or a transceiver module. System 1100 includes a grouping 1102 of electrical modules that can communicate with one another in connection with transmitting data to an access terminal. Grouping 1102 includes an electrical component 1104 for determining that an access terminal has requested a handoff from a first transceiver module to a second transceiver module. For instance, such determination can be made by analyzing an identity of a transceiver module indicated within a CQI report created by the access terminal. More particularly, the second transceiver module can receive a CQI report and determine that an identity of the second transceiver module corresponds to an identity indicated within the received CQI report. The identity can be any suitable indicia that can be utilized to identify the transceiver module amongst one or more other transceiver modules. It is thus understood that various manners for indicating an identity of the target transceiver module is contemplated by the inventors and intended to fall under the scope of the hereto-appended claims.

Grouping 1102 also includes an electrical component 1106 for receiving data from the first transceiver module as well as receiving an indication of what data should next be transmitted to the access terminal from the first transceiver module. For instance, a timestamp or other sequence number in an RLP packet header can indicate what data should be next transmitted to the access terminal. Grouping 1102 additionally includes an electrical component 1108 for receiving data from a network module, wherein the data is desirably transmitted to the access terminal. Pursuant to an example, the data received from the network module can be an IP-encapsulated data packet that is associated with a sequence number or stamp, thereby enabling the second transceiver module to determine what data to next transmit to the access terminal. Grouping 1102 can further include an electrical component 1110 for transmitting data to the access terminal in an appropriate sequence, wherein the data is received from the first transceiver module and the network module. In summary, the second transceiver module can receive data to be transmitted to the access terminal, wherein the data is not duplicative but should be transmitted in a particular sequence. System 1100 can also include a memory 1112, which can retain instructions relating to executing components 1104-1110. Alternatively, grouping 1102 and contents thereof can be comprised by memory 1112.

Referring now to FIG. 12, a system 1200 that facilitates informing a plurality of transceiver modules that an access terminal has requested a handoff from a first transceiver module to a second transceiver module is illustrated. System 1200 includes a grouping 1202 of electrical components, wherein such components can operate in conjunction to inform several transceiver modules of which transceiver module is currently servicing an access terminal. Grouping 1200 includes an electrical component 1204 for receiving an indication that an access terminal has requested a handoff from a first transceiver module to a second transceiver module. In an example, the first transceiver module, the second transceiver module, or both transceiver modules can inform network module of the request.

Grouping 1200 also includes an electrical component 1206 for indicating to a plurality of transceiver modules that the second transceiver module is servicing the access terminal. For instance, a network module can provide an IP address of the servicing transceiver modules to a plurality of transceiver modules. System 1200 further comprises a memory 1208, wherein memory 1208 can include instructions that are executed by grouping 1202. Alternatively, grouping 1202 can be resident within memory 1208.

Turning now to FIG. 13, a system 1300 that facilitates provision of a partial data packet to a transceiver module that is servicing an access terminal is illustrated. System 1300 includes a grouping 1302 of electrical components that act together to complete such an end. Grouping 1302 includes an electrical component 1304 for receiving an indication that an access terminal has requested a handoff from a first transceiver module to a second transceiver module. Grouping 1302 can additionally comprise an electrical component 1306 for providing a partial data packet to the second transceiver module. The remaining portion of the data packet may have been previously transmitted to the access terminal by the first transceiver module. System 1300 additionally includes a memory 1308, wherein memory 1308 can include instructions that are accessible for execution by electrical components 1304 and 1306, respectively, or memory 1308 can include grouping 1302.

Figure 14:
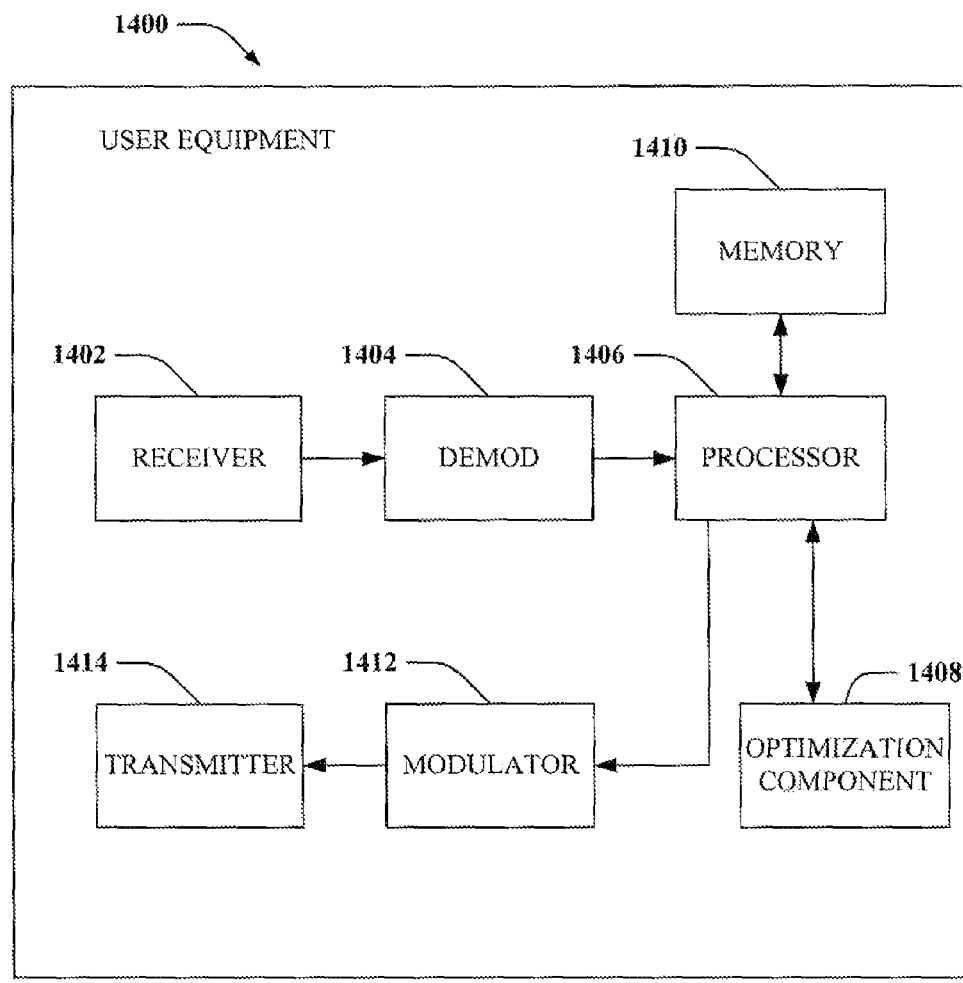
FIG. 14 is an illustration of an example system that can be utilized in connection with requesting a handoff.

FIG. 14 illustrates a system 1400 that can be utilized in connection with sequentially transmitting data to an access terminal before and after a handoff. System 1400 comprises a receiver 1402 that receives a signal from, for instance, one or more receive antennas, and performs typical actions thereon (e.g., filters, amplifiers, downconverts, . . . ) the received signal and digitizes the conditioned signal to obtain samples. A demodulator 1404 can demodulate and provide received pilot symbols to a processor 1406 for channel estimation.

Processor 1406 can be a processor dedicated to analyzing information received by receiver component 1402 and/or generating information for transmission by a transmitter 1414. Processor 1406 can be a processor that controls one or more portions of system 1400, and/or a processor that analyzes information received by receiver 1402, generates information for transmission by a transmitter 1414, and controls one or more portions of system 1400. System 1400 can include an optimization component 1408 that can optimize performance of user equipment before, during, and/or after handoff. Optimization component 1408 may be incorporated into the processor 1406. It is to be appreciated that optimization component 1408 can include optimization code that performs utility based analysis in connection with determining whether to handoff from a source transceiver module to a target transceiver module. The optimization code can utilize artificial intelligence based methods in connection with performing inference and/or probabilistic determinations and/or statistical-based determination in connection with performing handoffs.

System (user equipment) 1400 can additionally comprise memory 1410 that is operatively coupled to processor 1406 and that stores information such as signal strength information with respect to a base station (transceiver module), scheduling information, and the like, wherein such information can be employed in connection with determining whether and when to request a handoff. Memory 1410 can additionally store protocols associated with generating lookup tables, etc., such that system 1400 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1410 is intended to comprise, without being limited to, these and any other suitable types of memory. Processor 1406 is connected to a symbol modulator 1412 and transmitter 1414 that transmits the modulated signal.

Figure 15:
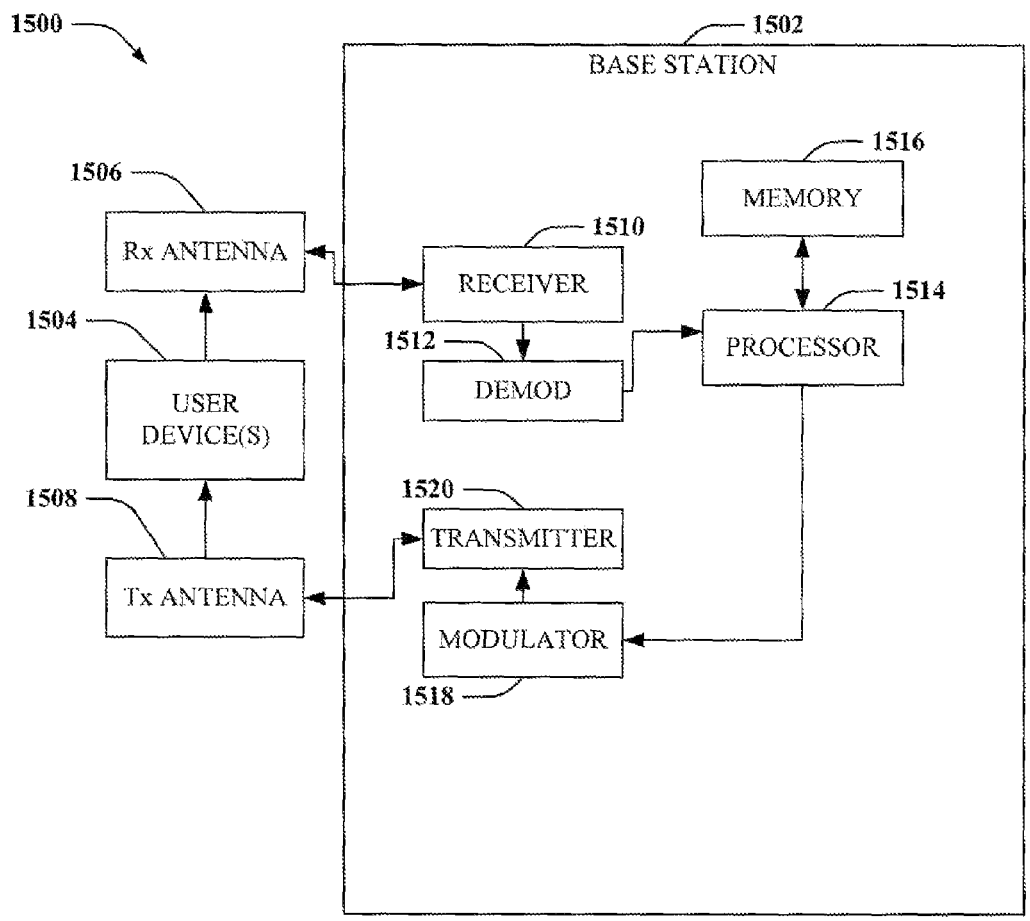
FIG. 15 is an illustration of an example system that can be utilized in connection with generating receiver status messages for data received from an access terminal.

FIG. 15 illustrates a system that may be utilized in connection with receiving an indication of handoff and/or transmitting data to an access terminal accordingly. System 1500 comprises a base station 1502 with a receiver 1510 that receives signal(s) from one or more user devices 1504 by way of one or more receive antennas 1506, and transmits to the one or more user devices 1504 through a plurality of transmit antennas 1508. In one example, receive antennas 1506 and transmit antennas 1508 can be implemented using a single set of antennas. Receiver 1510 can receive information from receive antennas 1506 and is operatively associated with a demodulator 1512 that demodulates received information. Receiver 1510 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1514 that is similar to the processor described above with regard to FIG. 14, and is coupled to a memory 1516 that stores information related to user device assignments, lookup tables related thereto and the like. Receiver output for each antenna can be jointly processed by receiver 1510 and/or processor 1514. A modulator 1518 can multiplex the signal for transmission by a transmitter 1520 through transmit antennas 1508 to user devices 1504.

It is to be understood that the embodiments described herein may be implemented by hardware, software, firmware, middleware, microcode, or any combination thereof. For a hardware implementation, the processing units within an user equipment or a network device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case it can be communicatively coupled to the processor through various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" is interpreted when employed as a transitional word in a claim.

What is claimed is:

1. A method for handoff at a target base station, comprising:
   receiving, at the target base station, first data for an access terminal, from a source base station, the first data including at least one data packet that has been assigned a sequence number;
   receiving, at the target base station, an indicator directly from the source base station, the indicator identifying a next sequence number that should be assigned to a next packet for the access terminal that has not been assigned a sequence number;
   receiving second data from a network module for the access terminal, at the target base station, the second data including at least one data packet having no assigned sequence number;
   assigning, by the target base station, at least one sequence number to the second data, starting at the next sequence number, wherein each data packet from the second data is assigned a different sequence number, the at least one sequence number facilitating determination of a data order of the first data received from the source base station and the second data received from the network module; and
   transmitting the first and second data from the target base station to the access terminal.

2. The method of claim 1, further comprising receiving a partial data packet from the source base station.

3. The method of claim 1, further comprising,
   receiving an IP-encapsulated data packet from the network module, the IP-encapsulated data packet being associated with a stamp, the stamp indicating a position of the IP-encapsulated data packet within a sequence of packets for the access terminal.

4. The method of claim 1, further comprising ordering the first data received from the source base station by analyzing information within a header of a received data packet.

5. The method of claim 4, wherein the information within the header comprises a Radio Link Protocol (RLP) stamp.

6. The method of claim 1, further comprising receiving an indication from the access terminal that the access terminal is requesting a handoff from the source base station to the target base station.

7. The method of claim 1, further comprising determining that the access terminal has requested a handoff from the source base station to the target base station when the target base station receives the data from the source base station.

8. A target base station, comprising:
   a memory that comprises instructions for:
      receiving first data for an access terminal, from a source base station, at the target base station, the first data including at least one data packet that has been assigned a sequence number;
      receiving, at the target base station, an indicator directly from the source base station, the indicator identifying a next sequence number that should be assigned to a next packet for the access terminal that has not been assigned a sequence number;
      receiving second data from a network module, for the access terminal, at the target base station, the second data including at least one data packet having no assigned sequence number;
      assigning, by the target base station, at least one sequence number to the second data, starting at the next sequence number, wherein each data packet from the second data is assigned a different sequence number, the at least one sequence number facilitating determination of a data order of the first data received from the source base station and the second data received from the network module; and
      transmitting the first and second data to the access terminal; and
   a processor that is configured to execute the instructions within the memory.

9. The target base station of claim 8, wherein the memory further comprises instructions for determining that the first data is in the form of a partial data packet.

10. The target base station of claim 8, wherein the memory further comprises instructions for determining that the access terminal is requesting a handoff to the target base station from the source base station.

11. The target base station of claim 8, wherein the memory further comprises instructions for determining that the access terminal has requested a handoff from the source base station to the target base station based on a Channel Quality Indicator (CQI) report received from the access terminal.

12. The target base station of claim 11, wherein the memory further comprises instructions for analyzing an identifier within the CQI report to determine that the access terminal has requested the handoff from the source base station to the target base station.

13. A non-transitory computer readable medium having stored thereon computer executable instructions for causing a target base station to:

determine that an access terminal has requested a handoff from a source base station to the target base station;

receive, at the target base station, first data for the access terminal, from the source base station, the first data including at least one data packet that has been assigned a sequence number;

receive, at the target base station, an indicator directly from the source base station, the indicator identifying a next sequence number that should be assigned to a next packet for the access terminal that has not been assigned a sequence number;

receive, at the target base station, second data for the access terminal, from a network module, the second data including at least one data packet having no assigned sequence number;

assign, by the target base station, at least one sequence number to the second data, starting at the next sequence number, wherein each data packet from the second data is assigned a different sequence number, the at least one sequence number facilitating determination of a data order of the first data received from the source base station and the second data received from the network module; and transmit, from the target base station, the first data received from the source base station and the second data received from the network module to the access terminal.

14. The non-transitory computer readable medium of claim 13 having stored thereon further computer executable instructions for causing the target base station to:

receive a CQI report from an access terminal; and determine that the access terminal requests a handoff to the target base station based on the CQI report.

15. The non-transitory computer readable medium of claim 13 having stored thereon further computer executable instructions for causing the target base station to determine that the access terminal desires to handoff from the source base station to the target base station based on the first data from the source base station.

16. The non-transitory computer readable medium of claim 13 having stored thereon further computer executable instructions for causing the target base station to indicate to the network module that the handoff has been completed successfully.

17. The non-transitory computer readable medium of claim 13 having stored thereon further computer executable instructions for causing the target base station to provide forward link scheduling information to the access terminal.

18. A target base station, comprising:

means for determining, at a target base station, that an access terminal has requested a handoff from a source base station to the target base station;

means for receiving, at the target base station, first data from the source base station and for receiving an indicator directly from the source base station, the first data including at least one data packet that has been assigned a sequence number, the indicator identifying a next sequence number that should be assigned to a next packet for the access terminal that has not been assigned a sequence number;

means for receiving, at the target base station, second data for the access terminal, from a network module, the second data including at least one data packet having no assigned sequence number;

means for assigning, by the target base station, at least one sequence number to the second data, starting at the next sequence number, wherein each data packet from the second data is assigned a different sequence number, the at least one sequence number facilitating determination of a data order of the first data received from the source base station and the second data received from the network module; and means for transmitting, at the target base station, the first data received from the source base station and the second data received from the network module to the access terminal.

19. The target base station of claim 18, further comprising means for framing the second data received from the network module into physical layer frames.

20. The target base station of claim 19, further comprising means for formatting the frames in accordance with RLP.

21. The target base station of claim 18, further comprising means for receiving a partial data packet from the source base station, wherein the partial data packet is a portion of an IP-encapsulated data packet.

22. A processor configured to execute instructions for a target base station to:

receive, at the target base station, first data from a source base station, the first data including at least one data packet that has been assigned a sequence number;

receive, at the target base station, an indicator directly from the source base station, the indicator identifying a next sequence number that should be assigned to a next packet for the access terminal that has not been assigned a sequence number;

receive, at the target base station, second data from a network module, the second data including at least one data packet having no assigned sequence number;

assign, by the target base station, at least one sequence number to the second data, starting at the next sequence number, wherein each data packet from the second data is assigned a different sequence number, the at least one sequence number facilitating determination of a data order of the first data received from the source base station and the second data received from the network module; and transmit the first data and the second data to the access terminal.

23. The processor of claim 22 configured to execute further instructions for framing the second data in a physical layer frame.

24. The processor of claim 22 configured to execute further instructions for determining that the access terminal requests handoff from the source base station to the target base station based on a CQI report from the access terminal.

* * * * *